United States Patent [19]

Chi

[11] 4,397,918

[45] Aug. 9, 1983

[54] FUEL CELL STACK SHORTING METHOD AND APPARATUS

[75] Inventor: Chang V. Chi, Brookfield, Conn.

[73] Assignee: Energy Research Corporation, Danbury, Conn.

[21] Appl. No.: 366,659

[22] Filed: Apr. 8, 1982

[51] Int. Cl.³ .............................................. H01M 8/04
[52] U.S. Cl. ...................................... 429/26; 429/120
[58] Field of Search ............................ 429/26, 18, 120

[56] References Cited

U.S. PATENT DOCUMENTS

| 3,964,929 | 6/1976 | Grevstad | 429/26 |
| 4,192,906 | 3/1980 | Maru | 429/13 |
| 4,377,445 | 3/1983 | Grimes | 429/18 X |

Primary Examiner—Charles F. LeFevour

[57] ABSTRACT

Electrical conductive means is used to connect first and second cooling assemblies of a fuel cell stack to thereby establish a short circuit path which bypasses the fuel cells situated between these cooling assemblies 24 Claims, 3 Drawing Figures

FUEL CELL STACK SHORTING METHOD AND APPARATUS

BACKGROUND OF THE INVENTION

This invention relates to fuel cell stacks and, in particular, to gas cooled fuel cell stacks.

In general, gas cooled fuel cell stacks are provided with cooling assemblies which are distributed throughout the stack length. Successive cooling assemblies typically sandwich a plurality of fuel cells which are cooled by the assemblies. A fuel cell stack of this type is disclosed in U.S. Pat. No. 4,192,906.

It sometimes happens in large stacks of the aforesaid type that one or more fuel cells become defective or inoperative and therefore have to be removed from the fuel cell circuit. Copending U.S. application Ser. No. 338,354, filed Jan. 11, 1982, and, assigned to the same assignee hereof, discloses a fuel cell stack in which removal of a defective cell is carried out by physically replacing a fuel cell sub-assembly which contains the defective cell. As taught in this application, replacement of the sub-assembly is greatly facilitated by forming each end of the sub-assembly, readily disconnectable component of a cooling assembly.

While the aforementioned practice of replacing sub-assemblies containing defective cells is highly advantageous, it does entail the added expense of providing replacement subassemblies. Also, while the replacement procedure is comparitively simple, it takes time which results in downtime for the stack.

In stacks of the above type employing a large number of cells such as might be used by public utilities, the occurrence of a few defective cells is not of significance to the stack output. Thus, physical replacement of the cells is not required from a performance standpoint, but only to realize a closed electrical circuit. Furthermore, in large stacks of this type, unscheduled downtime has to be kept at an absolute minimum. As a result, downtime to replace an entire sub-assembly due to cell failure is undesirable, especially when it is not required to achieve suitable stack output.

One way to alleviate this problem would be to short circuit the defective cell or cells. To be useable, however, a short circuit arrangement would have to be mechanically and electrically sturdy, since it would be subject to physical abuse and would be required to operate for 40,000 hours or more. Furthermore, it would have to exhibit a minimum of electrical resistance drop and interfacial resistance. Finally, and quite importantly, it would have to distribute the current to the cells immediately adjacent the defective cell as uniformly as possible so that such adjacent cells and the remaining cells maintain acceptable performance.

To provide a short circuit arrangement having the aforementioned characteristics between cells would be extremely difficult and time consuming, if not impossible. This is due to the fragile nature of the individual cell components which are extremely thin. As a result, attempts at shorting between cells could lead to damaging of the cells as well as to a resultant short whose mechanical strength and resistance are unsuitable.

It is therefore an object of the present invention to provide a practice for shorting a fuel cell stack which does not suffer from the aforesaid disadvantages.

It is a further object of the present invention to provide a shorting connection for a fuel cell stack which exhibits high mechanical and electrical strength, low resistance drop and interfacial contact resistance and uniform current distribution.

SUMMARY OF THE INVENTION

In accordance with the principles of the present invention, the above and other objectives are realized by a practice wherein electrically conductive means is used to connect first and second cooling assemblies between which are situated one or more fuel cells, the conductive means establishing a short circuit path which bypasses these fuel cells.

With the aforesaid practice of connecting a conductive means between stack cooling assemblies, the conductive means can now be a relatively thick conductor with a low resistance drop. Furthermore, the conductive means can be made to extend into the cooling assembly passages so as to realize a low contact resistance and a uniform current distribution. Additionally, inserting the conductive means in the cooling passages causes a needed reduction in cooling, since cooling of the shorted cells is no longer required. An overall stack is thereby realized whose performance is substantially undisturbed by the shorting practice.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
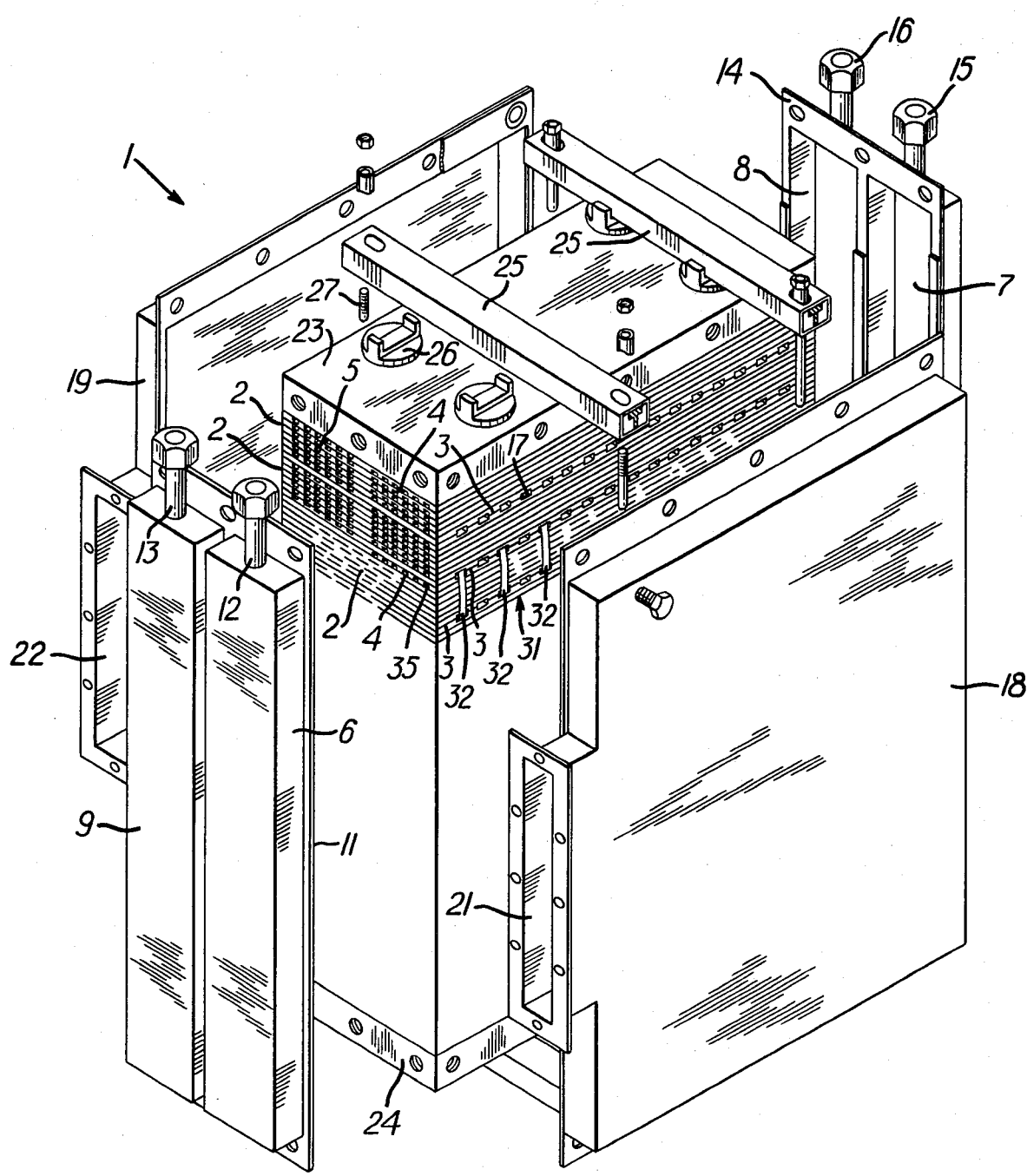
FIG. 1 shows a fuel cell stack adapted in accordance with the principles of the present invention.
Figure 3:
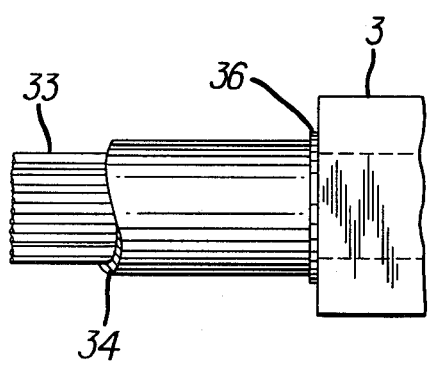
FIG. 3 illustrates an end of a shorting conductor of the stack of FIG. 1.

FIG. 1 shows a fuel cell stack 1 in accordance with the principles of the present invention. The stack 1 comprises sets or groups of one or more fuel cells 2 which are separated by cooling assemblies 3. Individual fuel cells of the sets 2 are provided with passages 4 for conveying fuel process gas through the cells and passages 5 for conveying oxidant process gas through the cells. These passages communicate with input manifolds 6 and 7 and output manifolds 8 and 9, respectively, and follow a z-shaped path. The manifolds 6 and 9 are formed from a common plate 11 and have access conduits 12 and 13. Likewise, the manifolds 7 and 8 are formed from a common plate 14 and have access conduits 15 and 16.

Cooling assemblies 3 each have a succession of cooling passages 17. These passages communicates with input and output cooling gas manifolds 18 and 19. Manifolds 18 and 19 further have access openings 21 and 22.

The stack 1 further includes end plates 23 and 24 located at opposite stack ends. These plates apply compression to the stack via a compression assembly comprising compression bars 25, seating pads 26 and tie bars 27.

In the course of operating the stack 1, if one or more cells of the stack become defective, it becomes necessary to remove the defective cell from the stack electrical circuit. In accordance with the principles of the present invention, this is realized by providing the stack 1 with an electrical bypass or shorting arrangement which is adapted to preserve stack performance, while at the same time exhibit mechanical and electrical strength and integrity. More particularly, in accordance with the invention, like conductive means 31 are disposed on opposite sides of the stack 1, each conductive means being similarly connected between the successive cooling assemblies which sandwich the particular set of cells 2 containing the defective cell. In the present case, only one of the conductive means 31 is visible.

Figure 2:
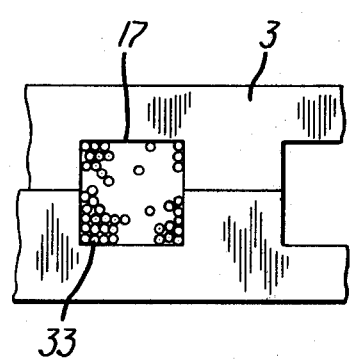
FIG. 2 shows a cross-section through a cooling passage containing shorting conductor of the stack of FIG. 1.

As shown, each conductive means 31 comprises individual conductors 32 each of which extends into and along the aligned passages 17 of the successive cooling assemblies 3. The conductors 32 are relatively thick owing to the relatively large size of the passages 17 and, as shown in FIG. 2, comprise stranded wire 33. By making the outer circumference of each conductor 32 just slightly less than the cross-section of its respective passages 17, the wire strands 33 of the conductor tend to undulate or corrugate upon insertion into the passages. This effect creates a large number of contact areas between each conductor 32 and the walls of its respective passages 17 and, as a result, a minimum contact resistance results. Furthermore, since the conductors 32 are relatively thick, virtually no resistance drop occurs across the conductors.

In further accord with the invention, the conductors 32 are arranged to provide a relatively uniform distribution of current, as well as to reduce stack cooling to compensate for cooling no longer needed by the bypassed cells. These effects are realized in the present case by inserting each conductor 32 as deeply as possible into its respective passages 17 and by utilizing conductors only for every other passage. Furthermore, the process gas passages 4 and 5 of the bypassed set of cells are closed or plugged by using a material 35 such as, for example, Viton, so that no electromechanical reaction takes place in these cells.

To protect the conductors 32 from the corrosive effects of the stack environment and from electrical contact with the edges of the bypassed cells, the region of each conductor external to the passages 17 is encased within an electrically insulating, corrosive resistance coating 34 such as, for example, Teflon or Viton. Additionally, the wire strands inside each passage are likewise protected by plugging the open area of each passage end with a similar corrosive resistance material 36.

After a defective cell is detected and the process and cooling gas manifolds of the stack 1 are removed, shorting is effected in accordance with the invention by inserting the conductors 32 into the corresponding cooling passages 17. This is carried out so that the strands 33 of the conductors extend as deeply as possible in the respective passages. Viton is then used to plug the ends of the cooling passages and the ends of the process gas passages 4 and 5 of the cells being bypassed. The manifolds are then reconnected and the stack is ready to resume operation.

The present practice is thus readily carried out and resultant downtime of the stack is greatly minimized. At the same time, a shorting connection is realized which is electrically and mechanically stable and which ensures uniform current distribution and cooling compensation.

In all cases, it is understood that the above-described arrangements are merely illustrative of the many possible specific embodiments which represent applications of the present invention. Numerous and varied other arrangements can readily be devised without departing from the spirit and scope of the invention. For example, while the stack 1 has been shown as provided with conductive means 31 on opposite stack sides, it could also have been provided with such means on one side of the stack only.

What I claim is:

1. A fuel cell stack comprising:
 a plurality of cooling assemblies;
 a number of fuel cells situated between successive of said cooling assemblies;
 and conductive means connecting first and second of said cooling assemblies establishing a short circuit path which electrically bypasses the fuel cells situated between said first and second cooling assemblies.

2. A fuel cell stack in accordance with claim 1 wherein:
 said connecting means comprises one or more conductive members.

3. A fuel cell stack in accordance with claim 2 wherein:
 said first and second cooling assemblies each have a plurality of passages therethrough for carrying a cooling gas;
 and each of said conductive members has one end extending into and along a first end of a difference passage of said first cooling assembly and another end extending into and along a first end of a different passage of said second cooling assembly.

4. A fuel cell stack in accordance with claim 3 wherein:
 the passages of said first cooling assembly into which said conductive members extend and the passages of said second cooling assembly into which said conductive members extend are selected to reduce cooling of said stack by the amount of cooling required to cool said cells between said first and second cooling means.

5. A fuel cell stack in accordance with claim 4 wherein:
 each of said fuel cells has process gas channels for carrying oxidant and fuel process gases;
 and said stack further includes means for closing the process gas channels of the fuels cells situated between said first and second cooling assemblies.

6. A fuel cell stack in accordance with claim 3 or 4 wherein:
 the passages of said first cooling assembly into which said conductive members extend and the passages of said second cooling assembly into which said conductive members extend are selected to promote uniform current distribution in said first and second cooling assemblies.

7. A fuel cell stack in accordance with claim 3 wherein:
 said passages of said first cooling assembly are arranged in succession;
 said passages of said second cooling assembly are arranged in succession;
 alternate ones of said passages of said first cooling assembly have conductive members extending therein;
 and alternate ones of said passages of said second cooling assembly have conductive members extending therein.

8. A fuel cell stack in accordance with claim 1 wherein:

said first and second cooling assemblies each have one or more passages therethrough for carrying a cooling gas;

and a first conductive member has one end extending into a first end of a first passage of said first cooling assembly and another end extending into a first end of a first passage of said second cooling assembly.

9. A fuel cell stack in accordance with claim 8 wherein:

a second conductive member has one end extending into a second end of said first passage of said first cooling assembly and another end extending into a second end of said first passage of said second cooling assembly.

10. A fuel cell stack in accordance with claim 8 or 9 wherein:

the section of each said conductive members exterior of said first and second passages includes a coating for electrically insulating said section from the fuel cells situated between said first and second cooling assemblies and for protecting said section from the corrosive components associated with said fuel cells.

11. A fuel cell stack in accordance with claim 10 further comprising:

means for closing the open area of the first and second ends of said first passage and the open area of the first and second ends of said second passage with a material resistant to the corrosive components of said fuel cells.

12. A fuel cell stack in accordance with claim 10 wherein:

said conductive members each include a plurality of conductive strands and the cross-section of said strands is less than the cross-section of the passage ends into which said conductive strands extend.

13. A fuel cell stack in accordance with claim 12 wherein:

said strands of each conductive member extending into a passage are corrugated.

14. A method of shorting a fuel cell stack of the type comprising a plurality of cooling assemblies between successive ones of which are situated a number of fuel cells, the method comprising:

connecting a conductive means to a first cooling assembly;

and connecting said conductive means to a second cooling assembly;

whereby a short circuit path is established which electrically bypasses the fuel cells situated between said first and second cooling assemblies.

15. A method in accordance with claim 14 wherein:

said connecting steps include inserting one end of a conductive member into a passage in said first cooling assembly and inserting the other end of said conductive member into a passage in said second cooling assembly.

16. A method in accordance with claim 15 wherein said connecting steps further include:

inserting first ends of further conductive members in further passages of said first cooling assembly and inserting second ends of said further conductive members into further passages in said second cooling assembly.

17. A method in accordance with claim 16 wherein:

the passages of said first and second cooling assemblies into which conductive members are inserted are selected to reduce cooling of said stack by the amount of cooling required to cool said cells between said first and second cooling assemblies.

18. A method in accordance with claim 17 further comprising:

closing the process gas channels of said cells situated between said first and second cooling assemblies.

19. A method in accordance with claim 15 or 16 wherein:

said inserting steps result in said ends of said conductive members extending maximally into said passages.

20. A method in accordance with claim 15 or 16 wherein:

said inserting steps result in the conductive strands of said conductive members within said passages becoming corrugated.

21. A method in accordance with claim 15 or 16 wherein:

said conductive members exterior of said passages include a coating for electrically insulating said conductors from the fuel cells situated between said first and second cooling assemblies and for protecting said conductors from the corrosive components of said fuel cells.

22. A method in accordance with claim 21 further comprising:

plugging the ends of said passages into which conductive members are inserted with a material resistant to the corrosive components of said cells.

23. A method in accordance with claim 16 wherein:

the passages of said first and second cooling assemblies into which said conductive members extend are selected to promote uniform current distribution in said first and second cooling assemblies.

24. A method in accordance with claim 16 wherein:

said passages of said first cooling assembly into which said conductive members are inserted are alternate passages of said first cooling assembly;

and said passages of said second cooling assembly into which said conductive members are inserted are alternate passages of said second cooling system.

* * * * *